United States Patent [19]
Ogihara et al.

[11] 3,886,573
[45] May 27, 1975

[54] ELECTROMAGNETIC CONTROL DEVICE FOR ELECTRICALLY-OPERATED SHUTTER

[75] Inventors: Masuo Ogihara; Masanori Watanabe, both of Chiba, Japan

[73] Assignee: Seiko Koki Kabushiki Kaisha, Japan

[22] Filed: Sept. 10, 1973

[21] Appl. No.: 395,589

[30] Foreign Application Priority Data
Sept. 11, 1972 Japan............................ 47-105074

[52] U.S. Cl. .................. 354/258; 354/51; 354/266
[51] Int. Cl. ............................................ G03b 9/62
[58] Field of Search ... 95/53 EB; 354/48, 50, 234-5, 354/266

[56] References Cited
UNITED STATES PATENTS
3,535,991  10/1970  Kitai ........................ 95/53 EB UX
3,722,391  3/1973   Kitai ............................... 95/53 EB Primary Examiner—Samuel S. Matthews
Assistant Examiner—James LaBarre
Attorney, Agent, or Firm—Robert E. Burns; Emmanuel J. Lobato; Bruce L. Adams

[57] ABSTRACT

An electrically-operated shutter having an electromagnetic control device that has an armature biased by a biasing spring toward an attracted position. The biasing force is opposed to the direction in which a shutter-operating mechanism applies a shutter-closing force when released by the armature upon de-energization thereof at termination of the exposure time. In order to insure the closing of the shutter takes place at the termination of an exposure time a lag in closing the shutter is avoided by rendering the biasing force of the biasing spring ineffective. The biasing spring the armature of the electromagnetic device has a deflectable part that is deflected by the camera release lever so that it cannot bias the armature. The release lever is manually actuated and accomplishes the disenabling of the spring during the tanking of a photograph before the termination thereof which corresponds to after the shutter commences to be opened but before it commences to close.

3 Claims, 3 Drawing Figures

ELECTROMAGNETIC CONTROL DEVICE FOR ELECTRICALLY-OPERATED SHUTTER

BACKGROUND OF THE INVENTION

This invention relates generally to a new and improved electrical and electronically operated shutter and more particularly an electromagnet device therefor.

In known electrical or electronically operated shutters the electromagnet control mechanism generally has provision for having the electromagnet in the control circuit electrically energized when the camera release button is actuated to effect a photographic exposure. The electromagnet is electrically energized and holds the shutter-operating mechanism in an open condition until it is electrically de-energized to terminate the photographic exposure as a function of the exposure time necessary to compensate for the brightness of the scene being photographed.

In order to insure that the electromagnet maintains the shutter-operating mechanism open provision is generally made for insuring that the mechanism is maintained open even if there is a partial loss of holding power on the part of the electromagnet. This may be accomplished by simply increasing the voltage of the electric source to the electromagnet. This method has the short-coming that it makes greater use of space. A more used solution is to bias the armature of the electromagnet or operating element against the iron core of the operating coil by use of a spring. Thus the spring and the electromagnet insure that the shutter-operating mechanism is kept in a position or condition maintaining the shutter opened. However when the shutter is to be closed and the exposure time determined automatically by the electrical control circuit has elapsed the electromagnet is demagnetized or de-energized and the closing mechanism has to be operated against the force of the biasing spring which biases the armature against the electromagnet that's described herefore. The necessity of acting against the spring force introduces an unbalanced or undesirable lag condition into the closing operation of the shutter blades. Thus the closing of the shutter blades is not as accurate as it might otherwise be.

SUMMARY OF THE INVENTION

It is a principal object of the present invention to provide an electromagnetic control mechanism in the shutter which eliminates the above mentioned shortcoming and provides for accurately closing the shutter at the correct exposure time.

According to the invention an electrically-operated shutter has a shutter-operating mechanism for selectively opening and closing the shutter. A control circuit determines the exposure time which is a function of the brightness of the object being photographed. The control circuit has an electromagnet and armature control means that releasably maintain the shutter-operating mechanism in a condition holding the shutter open until the electromagnet is de-energized. A biasing spring constantly biases the armature toward a core of the operating coil of the electromagnet for insuring the maintaining of the shutter open during the taking of an exposure. The shutter-operating mechanism has this spring force along with the attractive force of the armature applied to it holding it from closing the shutter. In order to remove the spring force so that the shutter-operating mechanism may accurately, timewise, close the shutter when the electromagnet is de-energized the biasing spring is rendered ineffective temporarily before the shutter is opened and therefore the closing of the shutter begins until it is closed. After closing of the shutter the spring is again rendered effective. This is accomplished by the camera release lever for taking the photographic exposure.

BRIEF DESCRIPTION OF THE DRAWINGS

Other features and advantages of the electromagnet control mechanism and shutter in accordance with the invention will be better understood as described in the following specification, and appended claims with the following drawings in which:

BRIEF DESCRIPTION OF A PREFERRED EMBODIMENT

Figure 1:
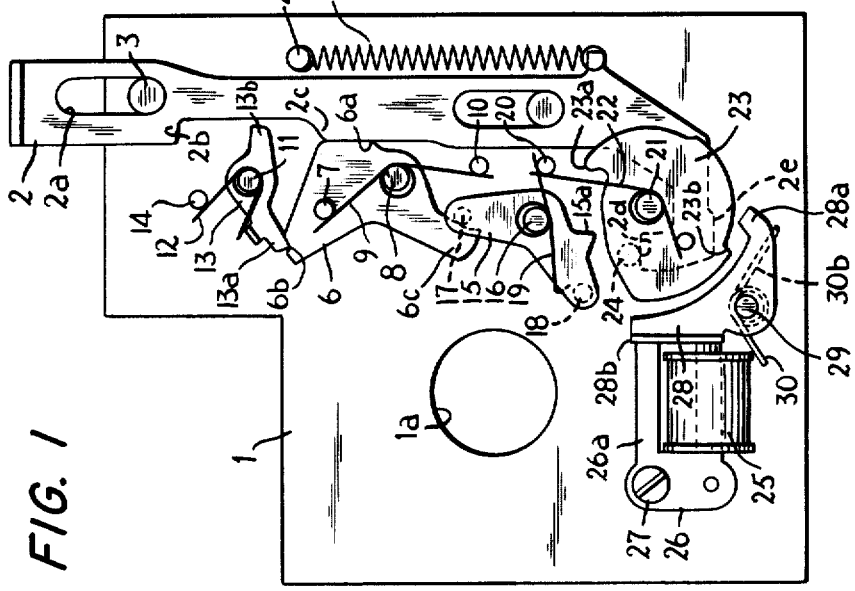
FIG. 1 is a plan view of a shutter provided with an electromagnetic control mechanism according to the invention.

A shutter provided with an electromagnetic control mechanism in accordance with the invention is illustrated in the drawings and particularly in FIG. 1 in a rest and cocked condition in readiness for taking an exposure. The shutter comprises a baseboard 1 having an exposure aperture 1a thereon. An exposure lever 2 operated when a photographic exposure is taken is movably mounted on the baseboard and is provided with two elongated slots 2a in which are disposed respective guide pins 3 for guiding it during axial movement thereof. A pin 4 fixed on the baseboard has one end of a biasing spring 5 connected thereto. The spring 5 is connected at an opposite end to a tab on the release lever 2 and biases the release lever 2 in an upward position to a rest position illustrated in the drawing in which the guide pins 3 are set at one end of the slots 2a. The release lever is provided with a first projection or cam 2b adjacent one end thereof and a long side projection or cam surface 2c axially spaced from the first projection or cam and a third projection or stop constructed as a finger 2d at the lower end with a fourth cam 2e adjacent thereto at the base of the lever. These projections or cams function as hereinafter described.

A set lever 6 provided with a pin 7 fixed thereon is pivotally mounted for rotation on a pivot 8 and is biased in a clockwise direction by a spring 9 that engages the pin 7 thereon and a fixed pin 10 on the baseboard 1. The set lever has a cam projection 6a that coacts or bears against the side cam 2c of the release lever which precludes its rotation clockwise when the release lever 2 is in its rest position as illustrated in FIG. 1.

A pivot 11 on which a biasing spring 12 is mounted is provided for rotationally mounting a lock pawl 13 and has a pawl arm 13a engaging in a notch 6b of the set lever 6 for holding it in a releasably locked condition. The pawl 13 is provided with a cam arm 13b operative as hereinafter described. Its biasing spring 12 has one end bearing on a tab, on the arm 13a, which is normal to the plane of the drawing and against a fixed pin 14 on the baseboard and biases the pawl counterclockwise.

A shutter-operating lever 15 for opening and closing the shutter is pivotally mounted on a pivot 16 and is constructed as a two-arm lever having pins 17, 18 fixed on respective arms thereof. One arm is provided with a projecting cam 15a. The shutter-operating lever 15 is biased in a counterclockwise direction by a spring 19 having one end bearing on an arm of the lever and the opposite end of a fixed pin 20 mounted on the baseboard 1. A pivot 21 on the baseboard has a biasing spring 22 wound thereon pivotally mounting and biasing a shutter-closing lever 23 in a counterclockwise direction. The biasing spring 22 bears on a pin on the lever and on the fixed pin 20 on the baseboard as illustrated. The shutter-closing lever 23 is provided with a first cam 23a and a second cam 23b defining a shoulder on the periphery thereof. A stud or pin 24 is fixed to an underside thereof and abuts against the stop or finger 2d of the release lever 2. The shutter-closing lever 23 is therefore restricted from rotating counterclockwise.

An electromagnetic control device having an electromagnet is provided for controlling closing of the shutter blades, not shown, actuated by the shutter-actuating pin 18 on the shutter-operating lever 15. This electromagnet comprises an operating coil 25 with a core 26 that has two legs on it. The coil 25 is mounted on one of the legs and a second leg 26a is outside of the coil. The assembly is mounted on the baseboard with a screw 27 as illustrated.

The electromagnetic shutter control device or mechanism comprises a control lever 28 pivotally mounted on a pivot 29 on the baseboard and biased in a counterclockwise direction by a biasing spring 30 which has an arm 30b which is deflectable for engagement and disengagement with an arm 28a of the control lever as hereinafter described. A second arm 28b of the control lever is provided with a magnetizable piece that is attracted by the electromagnet when its operating coil is electrically energized so that it bears against the core 26 holding the control lever 28 in a releasable position in conjunction with the biasing spring 30. This second arm functions as an armature of the electromagnet.

Figure 2:
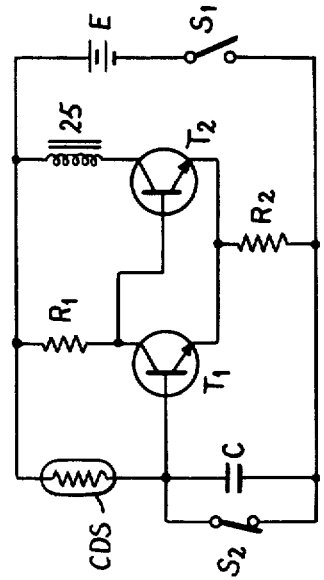
FIG. 2 is a schematic of an exposure time control circuit for use with the shutter according to the invention in FIG. 1.

A control circuit for controlling exposure time in the shutter according to the invention is illustrated in FIG. 2. The control circuit comprises a power source E in series with a power switch $S_1$ and across the switch and power source is connected an exposure time control circuit controlling exposure time as a function of the brightness of the scene being photographed. This circuit comprises a photoconductive cell Cds in series with a capacitor C. The capacitor is connected to the negative terminal of the electric power source E through the power switch and the photoelectric element is connected to the positive terminal of the power source E. A second switch $S_2$ is connected in parallel with the capacitor C. The parallel switch, capacitor and the photoelectric element or cell Cds are connected at a junction which is connected to the base of a first transistor $T_1$ which has its collector connected to the power source through a resistor $R_1$ and is likewise connected to the base of a second transistor $T_2$. The emitters of the first and second transistors are directly connected with each other and are connected with the negative terminal of the power source through a second resistor $R_2$ and the power switch $S_1$. The collector of the second transistor is connected to the positive terminal of the power source through the operating coil 25 of the electromagnet.

Figure 3:
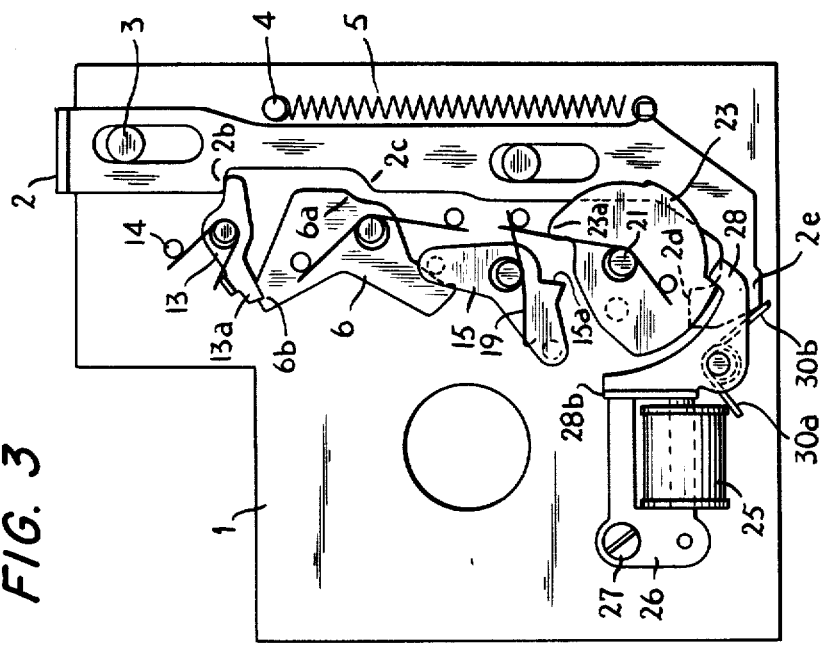
FIG. 3 is a plan view of the shutter and electromagnetic control mechanism of FIG. 1 illustrated in an operating condition.

As hereinafter described the first switch $S_1$ is normally open and is closed by the camera shutter release lever 2 during the preliminary movement of the release lever when it is actuated or depressed downwardly. The second parallel switch $S_2$ is normally closed so that it is opened when the set lever 6 is released from the cocked condition of the shutter, illustrated in FIG. 1, and it assumes its operating condition as illustrated in FIG. 3. In order to take a photographic exposure a camera button, not shown, is actuated and the release lever 2 is depressed downwardly. As the release lever moves downwardly its stop finger 2d is moved downwardly so that the shutter-closing lever 23 begins to rotate in a counterclockwise direction under control of its biasing spring. As mentioned heretofore the power switch $S_1$ is closed as the release lever 2 is depressed. Since the electric control circuit is now closed the second transistor $T_2$ is brought to a state of conductivity and electric current flows through the operating coil 25. Accordingly the electromagnet 25, 26 is excited and the armature 28b of the control lever 28 is attracted to the core 26. The control lever 28 is continuously biased in a counterclockwise direction by its biasing spring 30 and would normally continue to bias the armature in a direction for abutting the core of the electromagnet when the electromagnet is de-energized. Rotation of the shutter-closing lever 23 continues but its rotation is stopped when its profile cam 23b contacts the cam on the arm 28a of the control lever 28. That is, the counterclockwise turning effort of the shutter-closing lever 23 is temporarily delayed by the holding power of the energized electromagnet which holds the stop arm 28a in the path of rotation of the profile or profile cam 23b.

On the other hand the release lever 2 movement continues downwardly and its stop finger 2d moves to a lowered position so that it will not interfere with further rotation of the shutter-closing lever 23 when the electromagnet is de-energized as later explained. At the same time the second cam projection 2c of the shutter release lever 2 is moved to a position so that it will not hinder the set lever 6 from rotating clockwise to allow opening the shutter blades. The shutter blades, not shown, may be opened when the set lever 6 and the release lever 2 are disengaged by their coacting cams 2c, 6a. However, the release pawl 13 remains in its rest position so that the set lever 6 remains in its rest position even though it and the release lever 2 are disengaged. Eventually the downward movement of the release lever 2 causes its fourth or disengaging cam 2e to engage the deflectable arm 30b of the spring 30 of the control lever and disengage it therefrom so that the counterclockwise biasing force applied by this spring to the armature is rendered ineffective or removed. Since the armature 28b is already held in an attracted position by the electromagnet the shutter-closing lever 23 is maintained in a state of rest or stopped position by the control lever 28 which remains in the path of rotation of the shutter-closing lever 23. When the release lever reaches the position illustrated in FIG. 3 wherein its actuating cam 2b engages the pawl 13 and rotates it clockwise the set lever is released by the pawl and it beings to rotate in a clockwise direction under control of its own biasing spring. At the same time the shutter-operating lever 15 for opening and closing the shutter blades also rotates counterclockwise under control of its own spring force to open the shutter blades.

As the set lever 6 rotates clockwise the pin 7 thereon opens the parallel switch $S_2$ and the capacitor begins to be charged with current under control of the photoelectric cell Cds. Since the base potential of the first transistor $T_1$ is still low at this stage the first transistor is still nonconductive and the second transistor $T_2$ maintains its conductivity. Consequently the control lever 28 is maintained in its attracted condition as shown in FIG. 3.

As the charge of the capacitor C increases to a certain voltage corresponding to the exposure time in accordance with the intensity or brightness of the light being sensed the first transistor $T_1$ assumes a conductive condition and the second transistor $T_2$ becomes nonconductive. Accordingly the electromagnet 25, 26 is de-energized and the control lever 28 is free to be moved by the shutter-closing lever 23.

At the same time the shutter-closing lever 23 is unlocked or released by the control lever 28 since it is not held by the electromagnet nor the spring 30, and it begins to rotate counterclockwise further than the angular position to which it rotated when it was once stopped. As a result of this rotation the shutter-closing lever cam 23a contacts the cam projection 15a of the shutter-operating lever and rotates it in a clockwise direction against the force of its biasing spring 19 and the shutter-operating lever closes the shutter blades thereby closing the shutter aperture. Thus when the photographic exposure is completed and the application of downward pressure of the release lever 2 is removed in its restored upwardly by its biasing spring 5 after an exposure has been completed.

During the restoration of the release lever 2 the shutter is cocked. In an early state of its return movement the side cam 2c of the release lever rotates the set lever 6 counterclockwise by engaging its side cam 6a. Since the release lever 2 has its first side cam 2b disengaged from the pawl cam 13b the pawl 13 is restored by its own biasing spring and when the set lever completes its return movement the first arm 13a of the pawl 13 is received in the notch or recess 6b of the set lever to releasably lock it in position. At the lower end of the release lever 2 its fourth projection or stop finger 2e releases the deflected spring arm 30b of the control lever as the release lever returns. In this way the spring 30 reengages the control lever 28 and rotates it in the direction of the electromagnet so that the armature 28 is pressed against the iron core 26 and is restored to its rest position of readiness. When the set lever 6 substantially completes its return movement the third projection or stop arm 2d of the release lever engages the stop pin 24 of the shutter-closing lever 23 and the release lever rotates the shutter-closing lever clockwise against the force of its biasing spring to its cocked condition. The shutter-closing lever 15 is restored and its pin 17 bears against the stop arm 6c of the set lever 6 and the shutter is fully cocked and in a condition of readiness for taking the next exposure.

Thus those skilled in the art will readily recognize that the shutter can be energized in the present invention with a minimum operating voltage. Furthermore, the spring of the control lever is inactivated or rendered ineffective so that the exposure time is accurately controlled without any lag due to a necessity of overcoming the spring force which biases the armature against the electromagnet.

We claim:

1. In an electrically-operated camera shutter having a shutter-operating mechanism for selectively opening and closing the shutter, a control circuit comprising an electromagnet energized for releasably holding the shutter-operating mechanism in a condition in which the shutter is open and allowing closing of the shutter when de-energized, control means coactive with said shutter-operating mechanism comprising an armature attracted by said electromagnet when energized for releasably holding said shutter-operating mechanism in said open condition, a biasing spring constantly biasing said armature in a direction toward an operative position corresponding to its attracted position thereof when attracted by said electromagnet and resisting closing of said shutter of said shutter-operating mechanism, means operable for initiating opening of the shutter for taking an exposure and for rendering said spring ineffective before said opening of the shutter is initiated.

2. In an electrically-operated camera shutter according to claim 1, in which said means for rendering said biasing spring ineffective comprises a camera release lever actuated manually for taking an exposure.

3. In an electrically-operated shutter according to claim 2, in which said biasing spring comprises a deflectable spring part connected to said armature, and in which release lever comprises means temporarily disconnecting said biasing spring part from said armature before closing of said shutter by said shutter-operating mechanism.

* * * * *